United States Patent Office 3,352,675
Patented Nov. 14, 1967

3,352,675
PHOTOPOLYMERIZATION OF VINYL MONO-
MERS BY MEANS OF FERRIC SALTS OF
ORGANIC ACIDS
Edward Cerwonka, Binghamton, N.Y., assignor to General Aniline & Film Corporation, New York, N.Y., a corporation of Delaware
No Drawing. Filed Apr. 2, 1964, Ser. No. 356,973
11 Claims. (Cl. 96—35.1)

ABSTRACT OF THE DISCLOSURE

Photopolymerization of ethylenically unsaturated monomers by irradiation with actinic light in the presence of a ferric salt and a benzilic acid, preparation of polymeric resists by such process, and light-sensitive photographic elements in which said monomer and catalysts are dispersed in a water-soluble colloid carrier.

This invention relates to the photopolymerization of monomeric compounds containing the $CH_2=C<$ grouping while employing as a catalyst therefor the ferric salt of a benzilic acid and, more particularly, to photographic elements based thereon.

It has been known that ferric salts of certain organic acids may be reduced by actinic light. The ferrous ions so produced may be utilized with hydrogen peroxide to generate hydroxyl radicals according to Fenton's oxidation reaction which proceeds in accordance with the following equation:

$$Fe^{+2} + H_2O_2 \rightarrow Fe^{+3} + OH^- + OH$$

Baxendale et al. in Transactions of the Faraday Society, vol. 42, page 155 (1946), have shown that hydroxyl radicals formed in this manner will initiate the polymerization of vinyl monomers.

More recently, it has been demonstrated in U.S. Patent 3,101,270, dated Aug. 20, 1963 that a combination of a photosensitive ferric salt, vinyl monomer and hydrogen peroxide or other per compound may be used for photographic purposes, for example to form a relief image by photopolymerization. In this process, a ferric salt and a vinyl monomer are first incorporated in a photographic carrier, such as gelatin, and coated on a suitable support. This layer is then exposed to light to produce ferrous ions imagewise. After exposure, the coating is immersed in hydrogen peroxide or other per compound to initiate polymerization through the ferrous ions and form a polymeric image. Alternatively, a non-volatile per compound, for example, cumene hydroperoxide, may be dispersed or dissolved in the coated layer along with the ferric salt and the vinyl monomer. After exposure, the coating is immersed in water to develop the polymeric image. The immersion step, whether carried out in hydrogen peroxide or in water, is normally followed by a warm water wash (at about 40° C., for example) to remove the unpolymerized areas, thereby leaving a relief image.

It has now been discovered that normally liquid to solid monomers containing the $CH_2=C<$ grouping may be photopolymerized in bulk or in coated dry layers with UV light or light of the visible spectrum while employing as the sole catalyst therefor the ferric salt of benzilic acid

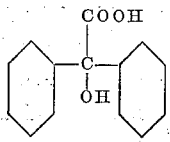

or derivatives thereof as shown:

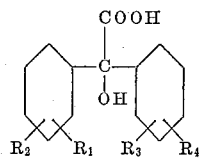

wherein the substituents $R_1$, $R_2$, $R_3$ and $R_4$ may be in the meta- and para-positions and are hydroxyl, alkyl, such as methyl, ethyl, propyl or the like, or vinyl groups. Any or all the positions indicated may be substituted without adversely affecting the effectiveness of the acid for the process described herein. Thus, the ferric salts of 4,4'-dihydroxybenzilic acid or of 3-methylbenzilic are equally effective catalysts. The ortho carbon atoms of the two rings may also be coupled together, as in diphenylene glycollic acid

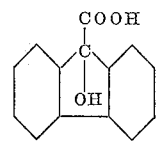

which has also been found to be a useful catalyst when used in the form of its ferric salt. Such a method of photopolymerization, and light-sensitive materials comprising a base coated with a vinyl monomer, the aforesaid catalyst, and a colloidal carrier, constitute the purposes and objects of the present invention.

Any normally liquid to solid compound containing the $CH_2=C<$ group or mixtures thereof may be used in this procedure. Suitable monomers are, for example, N,N'-methylenebisacrylamide, methylolacrylamide, N-ethanolacrylamide, acrylamide, calcium acrylate, acrylic acid, acrylonitrile, methacrylamide, methyl methacrylate, sodium methacrylate, or the like.

Examples of acids which I may use are benzilic, 3,3'-dihydroxybenzilic, 4,4'-dihydroxybenzilic, 4-vinylbenzilic, 4,4'-divinylbenzilic, 4-methylbenzilic, 4,4'-dimethylbenzilic, 4-hydroxybenzilic, diphenylene glycollic, and the like.

The ferric salts may be preformed and added as such to the composition or the ferric salt of the acid may be formed in situ. In such case, any inorganic ferric salt such as ferric chloride, ferric sulfate, ferric phosphate, ferric ammonium sulfate, or the like may be employed.

Water is a necessary component of the reaction mixture and water must be present for the photopolymerization even if the monomer is insoluble in water. In the case of vinyl monomer coatings, a water soluble colloidal carrier such as gelatin, glue, casein, hydroxyethyl cellulose, polyvinyl alcohol, poyvinyl pyrrolidone and the like may be used; sufficient water is then retained by the coating to permit the induction of photopolymerization.

The pH of the reaction mixture has a bearing on the rate at which polymerization is initiated. Preferably, I operate at pH values of 6.0 or below so as to prevent precipitation of the ferric salt.

The quantity of catalyst employed is a small fraction of the monomer which is subjected to polymerization. Typically, I use from 1 to 28 parts of the catalyst to each 100 parts of the monomer, with 7 parts of catalyst constituting the preferred ratio.

The UV radiation, either for bulk or imagewise polymerization, may be derived from a carbon arc lamp or a high intensity mercury vapor lamp. Visible radiation may be supplied by photoflash lamps or a tungsten filament lamp.

The most significant advantage of the present invention consists in the elimination of the per compound which was a necessary prerequisite of the prior art procedures. For imagewise polymerization in coated layers it is not necessary to add such a compound to the coating formulation nor need it be used in the processing solution. Water without other agents suffices to remove the unexposed, unpolymerized areas from the supporting element which may be paper, metal, or film base of the types normally employed in the manufacture of photographic films.

The invention is illustrated by the following examples, it being understood that it is not restricted thereto:

Example I

A coating solution was prepared as follows:

|   | G. |
|---|---|
| Hydroxyethyl cellulose | 2.5 |
| N,N'-methylenebisacrylamide | 2.0 |
| Benzilic acid | 0.114 |
| Ferric ammonium sulfate dodecahydrate | 0.241 |
| Water to make 50.0 ml. | |

The solution was coated in red light on baryta paper and allowed to dry. Exposure of a sample for 15 seconds to the light from a 375-watt reflector lamp at 16" was followed by an immediate water wash (40° to 50° C.). A colorless resist image was formed in the exposed areas.

Example II

The procedure was the same as in Example I, excepting that 15 grams of polyvinylpyrrolidone was used in place of the hydroxyethyl cellulose. Similar results were obtained.

Example III

A coating solution was prepared as follows:

|   | G. |
|---|---|
| Gelatin | 5.0 |
| N,N'-methylenebisacrylamide | 2.0 |
| Benzilic acid | 0.456 |
| Ferric ammonium sulfate dodecahydrate | 0.060 |
| Water to make 50.0 ml. | |

By coating and processing as in Example I a colorless resist was obtained.

Example IV

The procedure was the same as in Example I excepting that 4-hydroxybenzilic acid was substituted for the benzilic acid. Processing of the coating gave results similar to those of Example I.

Example V

A solution of the following ingredients was prepared:

|   | G. |
|---|---|
| Polyvinylpyrrolidone | 15 |
| N,N'-methylenebisacrylamide | 2 |
| Diphenylene glycollic acid | 0.113 |
| Ferric ammonium sulfate dodecahydrate | 0.241 |
| Water to make 50 ml. | |

The solution was coated on film base and allowed to dry in red light. Exposure of a sample of the coated film for 20 seconds to the light from a 375-watt reflector lamp at 16" was followed by an immediate water wash (40° to 50° C.). A colorless resist image was perceptible in the exposed areas.

Example VI

A solution of the following composition was prepared:

|   | G. |
|---|---|
| Natrosol "250L" (hydroxyethyl cellulose) | 2.5 |
| N,N'-methylenebisacrylamide | 2.0 |
| 4,4'-dihydroxybenzilic acid | 0.132 |
| Ferric ammonium sulfate dodecahydrate | 0.241 |
| Water to make 50 ml. | |

The solution was coated on baryta paper in red light and allowed to dry. A sample of the dried coating was exposed for a period of 20 seconds to the light from a 375-watt reflector lamp at 16". Washout of the coating with warm water left a colorless resist.

Example VII

A solution of the following composition was prepared:

|   | G. |
|---|---|
| Acrylamide | 180 |
| N,N'-methylenebisacrylamide | 7 |
| Water | 120 |

To 5 milliliters of the above solution was added one milliliter of an aqueous solution containing 197 milligrams of ferric ammonium sulfate and 93 milligrams of benzilic acid made up to a volume of 100 milliliters. The solution was stirred while exposed to the light of a 1000-watt tungsten lamp at a distance of 25 centimeters. Polymerization ensued after an exposure of approximately 2 minutes.

Example VIII

An aqueous solution of 4 grams of N,N'-methylenebisacrylamide was prepared. To 5 milliliters of this solution was added one milliliter of ferric benzilate solution made up as described in Example VII. This mixture was then exposed under the conditions described in the previous example. Polymer began to form after 2 minutes.

Example IX

To 5 milliliters of the solution of Example VII was added one milliliter of an aqueous solution containing 197 milligrams of ferric ammonium sulfate and 107 milligrams of 4,4'-dihydroxybenzilic acid made up to a volume of 100 milliliters. Under the exposure conditions described in Example VII, polymer began to form after an exposure of 2¼ minutes.

Example X

An aqueous solution of N,N'-methylenebisacrylamide was prepared as in Example VIII. To 5 milliliters of this solution was added one milliliter of an aqueous solution containing 197 milligrams of ferric ammonium sulfate and 93 milligrams of diphenylene glycollic acid made up to a volume of 100 milliliters. The mixture was exposed, without stirring, to the light of a 1000-watt tungsten lamp at a distance of 25 centimeters. An opaque polymer formed after 3½ minutes.

Various modifications may be made in the procedure without departing from the spirit of the invention. It is intended by the claims which follow, to cover such modifications as would suggest themselves to those skilled in the art.

What is claimed is:

1. A light-sensitive photographic element comprising a base coated with a water-soluble colloidal carrier having dispersed therein an ethylenically unsaturated monomer containing the group $CH_2{=}C{<}$ and ferric salt of a benzilic acid as the sole polymerization catalyst.

2. The article as defined in claim 1 wherein the polymerization catalyst is the ferric salt of an acid of the following formula:

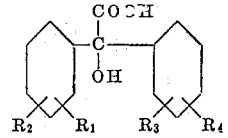

wherein $R_1$, $R_2$, $R_3$ and $R_4$ are selected from the class consisting of hydrogen, hydroxyl, alkyl and vinyl.

3. The article as defined in claim 2 wherein the polymerization catalyst is the ferric salt of benzilic acid.

4. The article as defined in claim 2 wherein the polymerization catalyst is the ferric salt of 4,4'-dihydroxybenzilic acid.

5. The article as defined in claim 1 wherein the polymerization catalyst is the ferric salt of diphenylene glycollic acid.

6. The article as defined in claim 1 wherein the carrier is hydroxyethyl cellulose and the monomer N,N'-methylenebisacrylamide.

7. The article as defined in claim 1 wherein the carrier is polyvinylpyrrolidone and the monomer is N,N'-methylenebisacrylamide.

8. The process of producing a polymeric resist which comprises exposing underneath a pattern a light-sensitive photographic element comprising a base coated with a water-soluble colloidal carrier having dispersed therein an ethylenically unsaturated monomer containing the group $CH_2=C<$ and the ferric salt of a benzilic acid as the sole polymerization catalyst to cause photopolymerization in the exposed areas of said element and removing the unexposed areas by washing with water.

9. The process as defined in claim 8 wherein the polymerization catalyst is a ferric salt of an acid having the following formula:

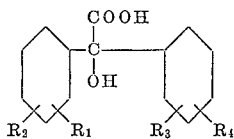

wherein $R_1$, $R_2$, $R_3$ and $R_4$ are selected from the class consisting of hydrogen, hydroxyl, alkyl and vinyl.

10. The process of photopolymerizing an ethylenically unsaturated monomer containing the group $CH_2=C$ which comprises subjecting said monomer to actinic radiation in the presence of a ferric salt of benzilic acid as the sole polymerization catalyst.

11. The process as defined in claim 10 wherein the polymerization catalyst is the ferric salt of an acid having the following formula:

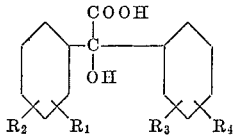

wherein $R_1$, $R_2$, $R_3$ and $R_4$ are selected from the class consisting of hydrogen, hydroxyl, alkyl and vinyl.

References Cited

UNITED STATES PATENTS

| | | | |
|---|---|---|---|
| 2,880,153 | 3/1959 | Hiltz et al. | 96—115 X |
| 2,989,455 | 6/1961 | Neugebauer et al. | 204—159.23 |
| 2,997,391 | 8/1961 | Murray et al. | 96—35.1 |
| 3,081,168 | 3/1963 | Leekley et al. | 96—115 X |
| 3,101,270 | 8/1963 | Evans et al. | 96—115 |

OTHER REFERENCES

Dainton, F. S., et al.: "Polymerization of Methacrylamide in Aqueous Solution," Trans Faraday Soc., vol. 59, June 1963, pp. 1377–84.

Wichterle, O., et al.: "Chem. Abstracts," vol. 52, p. 12529g, 1958.

NORMAN G. TORCHIN, *Primary Examiner.*

R. H. SMITH, *Assistant Examiner.*

Disclaimer

3,352,675.—*Edward Cerwonka*, Binghamton, N.Y. PHOTOPOLYMERIZATION OF VINYL MONOMERS BY MEANS OF FERRIC SALTS OF ORGANIC ACIDS. Patent dated Nov. 14, 1967. Disclaimer filed Sept. 30, 1982, by the assignee, *Eastman Kodak Co.*

Hereby enters this disclaimer to all claims of said patent.
[*Official Gazette March 22, 1983.*]